United States Patent [19]

Maeno et al.

[11] Patent Number: 4,796,054

[45] Date of Patent: Jan. 3, 1989

[54] CONTROL APPARATUS FOR A COLOR COPYING MACHINE

[75] Inventors: Satoru Maeno, Mie; Kenji Inoue, Ise; Masaaki Tanaka, Yokohama; Akira Ogita, Sagamihara, all of Japan

[73] Assignees: Fuji Xerox Co., Ltd.; Shinko Electric Co., Ltd., both of Tokyo, Japan

[21] Appl. No.: 862,020

[22] Filed: May 12, 1986

[30] Foreign Application Priority Data

May 16, 1985 [JP] Japan ................................ 60-104198

[51] Int. Cl.[4] ........................ G03G 15/00; G03B 27/50

[52] U.S. Cl. ...................................... 355/8; 355/14 R; 355/55

[58] Field of Search ..................... 355/8, 14 R, 14 TR, 355/3 TR, 55

[56] References Cited

U.S. PATENT DOCUMENTS 4,072,412 2/1978 Suda et al. ........................ 355/3 TR
4,332,461 6/1982 Cail et al. ........................... 355/14 R
4,436,416 3/1984 Negoro et al. ...................... 355/8 X
4,586,808 5/1986 Tanimoto et al. ....................... 355/8
4,705,386 11/1987 Ogita et al. ............................ 355/4

FOREIGN PATENT DOCUMENTS 2088572 6/1982 United Kingdom .
2092315 8/1982 United Kingdom .
2101344 1/1983 United Kingdom .

*Primary Examiner*—A. C. Prescott
*Assistant Examiner*—Jane Lau
*Attorney, Agent, or Firm*—Welsh & Katz, Ltd.

[57] ABSTRACT

A color copying machine contains a scanning unit driven by a motor for applying a color scanning beam onto a manuscript, a photoconductive drum operable to rotate for being exposed to the scanning beam to form on a peripheral surface thereof a latent image of the manuscript. The color copying machine further contains a device for applying a toner to the latent image to form a toner image, and a transfer drum for holding a record sheet onto which the toner image on the photoconductive drum is transferred. A main controller calculates data representative of a speed of the motor in accordance with a magnification rate of the copy image to be formed on the record sheet to the image on the manuscript, and outputs a pulse signal whose pulse rate is proportional to the calculated speed data. The main controller outputs the pulse signal to a controller which drives the motor at a speed determined by the pulse rate of the pulse signal. Thus, the speed of the scanning unit is determined in accordance with the magnification rate.

8 Claims, 14 Drawing Sheets

ROTATION ANGLE DETECTION CIRCUIT 310

CONTROL APPARATUS FOR A COLOR COPYING MACHINE

BACKGROUND OF THE INVENTION

1. Field of the Invention

This invention relates to a color copying machine or an electrophotographic copier.

2. Prior Art

A conventional color copying machine generally comprises a light source, movable mirrors, a photoconductive drum and a transfer drum, and these component parts are accurately driven in accordance with a predetermined timing to form an image on a record sheet.

FIG. 1 is a diagrammatical illustration showing the construction of a conventional color copying machine. The color copying machine comprises a body 1 which is provided at its upper portion with a platen 2 for placing a manuscript thereon. Mounted on the body 1 below the platen 2 is a scanning unit 3 which includes an elongated lamp 4, first and second mirrors 5 and 6, a filter-and-lens unit 7 and third and fourth mirrors 8 and 9. The lamp 4 is mounted on the body 1 so as to be reciprocally movable in unison with the first mirror 5, as indicated by arrows A and B in FIG. 1. The second mirror 6 is arranged so as to move in accordance with movement of the lamp 4 and first mirror 5 at a speed which is half of the speed of the movement of the lamp 4 and first mirror 5.

In operation, the lamp 4 and the first mirror 5 are first moved in the direction indicated by the arrow. A. As a result, an outer peripheral surface of the photoconductive drum 11 rotating counterclockwise is exposed to a beam of light which represents the image on the manuscript placed on the platen 2. In this case, the filter-and-lens unit 7 has been changed over so that it passes components of the light other than the yellow component. Also, the photoconductive drum 11 has been electrically charged by the charging device 12. And therefore, an electrostatic latent image corresponding to the yellow component of the image on the manuscript is formed on the surface of the photoconductive drum 11. A yellow toner is then attached to the electrostatic latent image on the photoconductive drum 11 by a first developing device 13, so that a yellow toner image is formed on the peripheral surface of the photoconductive drum 11.

On the other hand, a record sheet fed from a record-sheet tray 14 is wrapped around a transfer drum 15 rotating clockwise, and fed to a transfer position where the peripheral surface of the transfer drum 15 most closes with the peripheral surface of the photoconductive drum 11. As a result, the yellow toner image on the photoconductive drum 11 is transferred to the record sheet on the transfer drum 15. As the transfer of the toner image proceeds, the portion of the peripheral surface of the photoconductive drum 11 from which the toner image has been transferred to the record sheet is cleaned by a cleaning device 16.

When the transfer of the entire yellow toner image to the record sheet is completed, the filter-and-lens unit 7 is changed over so that it passes color components of the light other than the magenta component. At the same time, a second developing device 17 for a magenta color is selected, and another transfer operation is carried out in a manner described for the yellow toner image. Then, the filter-and-lens unit 7 is again changed over so that it passes color components of the light other than the cyan component, and a third developing device 18 is selected. And, a further transfer operation is carried out in the same manner. Thus, the toner images of the three primary colors, namely, yellow, magenta and cyan, are combined on the surface of the record sheet wrapped around the transfer drum 15 to form a color image. The record sheet on the transfer drum 15 is then fed by an endless belt 21 to a fixing device 22 at which the color image formed on the record sheet is fixed to the record sheet. When the fixing operation is completed, the record sheet is discharged to a tray 23, and the copying operation is terminated.

FIG. 2 shows in more detail the structure of the scanning unit 3, photoconductive drum 11 and transfer drum 15. A drive force of an electric motor (not shown) is transmitted through a chain 31 to a sprocket 33 which is mounted on a shaft 32 of the photoconductive drum 11. The shaft 32 is provided, at one end of the photoconductive drum 11, with a gear 34 which is in mesh with another gear 36 mounted on a shaft 35 of the transfer drum 15. With this arrangement, when the sprocket 33 is driven, the photoconductive drum 11 and the gear 34 rotate, so that the shaft 35 is driven through the gear 36, whereby the transfer drum 15 is rotated. In this case, the gears 34 and 36 are so arranged to have the same diameter and pitch, so that the photoconductive and transfer drums 11 and 15 rotate in the opposite directions at the same rotation speed in synchronization with each other. The transfer drum 15 is provided with retractable projections 37 for defining the position of a record sheet wrapped therearound so that the leading edge of each record sheet comes to the same position on the transfer drum 15.

On the other hand, the shaft 32 has a pulley 42 rotatably mounted thereon through a bearing 41. This pulley 42 is provided with a hook (not shown) driven by a drive means such as a solenoid. When the hook is driven so as to engage with a pin 43 mounted on the sprocket 33, the rotation of the shaft 32 is transmitted to the pulley 42, so that the pulley 42 rotates in unison with the photoconductive drum 11. The rotation of the pulley 42 is transmitted through a wire 44 to another pulley 48 of which rotation is transmitted through a shaft, pulleys, wires and so on to the scanning unit 3. Thus, when the pulley 42 is rotated, the lamp 4 and its associated parts move in the direction indicated by an arrow A in FIG. 2 in accordance with the rotation of the photoconductive drum 11. When the hook is released from the pin 43, the lamp 4 is returned to its home position by means of a spring (not shown).

With the above-described conventional color copying machine, the scanning unit 3 and the photoconductive drum 11 are mechanically connected to each other so that electrostatic images are formed on the photoconductive drum 11 at the same place. Also, since the photoconductive drum 11 and the transfer drum 15 rotate in opposite directions and the position of the leading edge of each record sheet wrapped around the transfer drum 15 is constant, positions of toner images transferred to a record sheet substantially coincide with one another, whereby a color image is formed.

To avoid undesirable shift or displacement of toner images transferred onto a record sheet, which deteriorates the quality of the resultant color image, the relationship between the position of the scanning unit 3 and that of the photoconductive drum 11 and the relationship between the position of the photoconductive drum 11 and that of the transfer drum 15 must be controlled extremely accurately. With the structure of the above-described conventional copying machine, however, all of the movable sections, i.e., the scanning unit 3, photoconductive drum 11 and transfer drum 15, are mechanically connected so as to move cooperatively with one another, so that the initial or home positions of those movable sections may vary due to their aged deterioration. Thus, the conventional color copying machine is deficient in that toner images transferred to a record sheet are liable to shift from one another.

With the conventional color copying machine, when it is desired to produce a copy of the original at a magnification rate other than "1", pulleys (for example, pulleys 48*a* and 48*b*) of different diameters must be provided, as shown in FIG. 2. In this case, one of the pulleys 48, 48*a* and 48*b* is selected in accordance with the magnification rate to change the speed of the scanning unit 3. With this structure, however, to increase the number of magnification rates available, the number of pulleys must also be increased. This makes the transmission mechanism complicated and requires much space.

SUMMARY OF THE INVENTION

It is therefore an object of the present invention to provide a control apparatus for a color copying machine in which a copy of an original manuscript can be obtained at any one of a large number of magnification rates with a simple structure.

It is another object of the invention to provide a control apparatus for a color copying machine in which a magnification rate can be varied substantially analogously.

It is a further object of the invention to provide a control apparatus for color copying machine which is free from undesirable shift of toner images transferred onto a record sheet.

It is a further object of the invention to provide a control apparatus for color copying machine in which the use of mechanical parts is minimized to enhance the reliability thereof.

According to an aspect of the present invention, there is provided a control apparatus for a color copying machine, the color copying machine comprising scanning means driven by a motor for applying scanning beam onto a manuscript to effect a scanning operation, the motor being driven by a drive means; a photoconductive drum operable to rotate for being exposed to the scanning beam to form on a peripheral surface thereof a latent image of an image on a scanned manuscript; means for applying a toner to the latent image to form a toner image on the peripheral surface of the photoconductive drum; and a transfer drum for holding a record sheet therearound on a peripheral surface thereof and operable to rotate to thereby transfer the toner image on the photoconductive drum to a held record sheet to form a copy image of the manuscript on the held record sheet; and the control apparatus comprising: means for providing data representative of a magnification rate of the copy image to be formed on the record sheet to the image on the manuscript; calculation means for calculating data representative of a speed of the motor in accordance with the magnification-rate data; and control means responsive to the speed data for driving the motor at a speed represented by the speed data said control means including pulse generating means for generating, in accordance with said speed data, a first pulse train whose pulse rate is determined by said speed data; rotary encoder means operatively connected to said motor for outputting a second pulse train, the number of pulses of said second pulse train representing the amount of rotation by which said motor has been rotated; and drive means having counter means for up-counting the pulses of one of said first and second pulse trains and for down-counting the pulses of the other of said first and second pulse trains, said drive means driving said motor so that a count output of said counter means always represents a predetermined value, whereby the scanning means effects the scanning operation at a speed determined by the magnification rate.

According another aspect of the invention, there is provided a control apparatus for a color copying machine, the color copying machine comprising scanning means driven by a first motor for applying a scanning beam onto a manuscript to effect a scanning operation; a photoconductive drum operable to rotate at a predetermined speed for being exposed to the scanning beam to form on a peripheral surface thereof a latent image of an image on a scanned manuscript; means for applying a toner to the latent image to form a toner image on the peripheral surface of the photoconductive drum; a transfer drum for holding a record sheet therearound on a peripheral surface thereof and driven by a second motor for rotating to thereby transfer the toner image on the photoconductive drum to a held record sheet at a transfer position where the transfer drum is in contact with the photoconductive drum through the held record sheet, whereby a copy image of the manuscript is formed on the held record sheet; and said control apparatus comprising means for providing data representative of a magnification rate of the copy image to be formed on the held record sheet to the image on the manuscript: calculation means for calculating data representative of a speed of the first motor in accordance with the magnification-rate data; first control means responsive to the speed data for driving the first motor at a speed determined by the speed data; second control means for driving the second motor; first detector means for outputting a first detection signal when the scanning means is at its home position; second detector means disposed at a predetermined position adjacent the transfer drum for detecting a leading edge of the held record sheet on the transfer drum to output a second detection signal; position detector means operatively connected to the transfer drum and responsive to the second detection signal for outputting data representative of a position of the leading edge of the held record sheet on the transfer drum; error detection means responsive to the first detection signal for detecting, in accordance with the position data, a difference between a peripheral length of the photoconductive drum from a position thereof where the scanning beam is applied to the transfer position and a peripheral length of the transfer drum from the leading edge of the record sheet to the transfer position, to output data representative of the difference; and error correction means responsive to the difference data for causing the second control means to change the speed of the second motor to compensate for the difference.

DESCRIPTION OF THE PREFERRED EMBODIMENTS OF THE INVENTION

Embodiments of the present invention will now be described with reference to the accompanying drawings.

Figure 1:
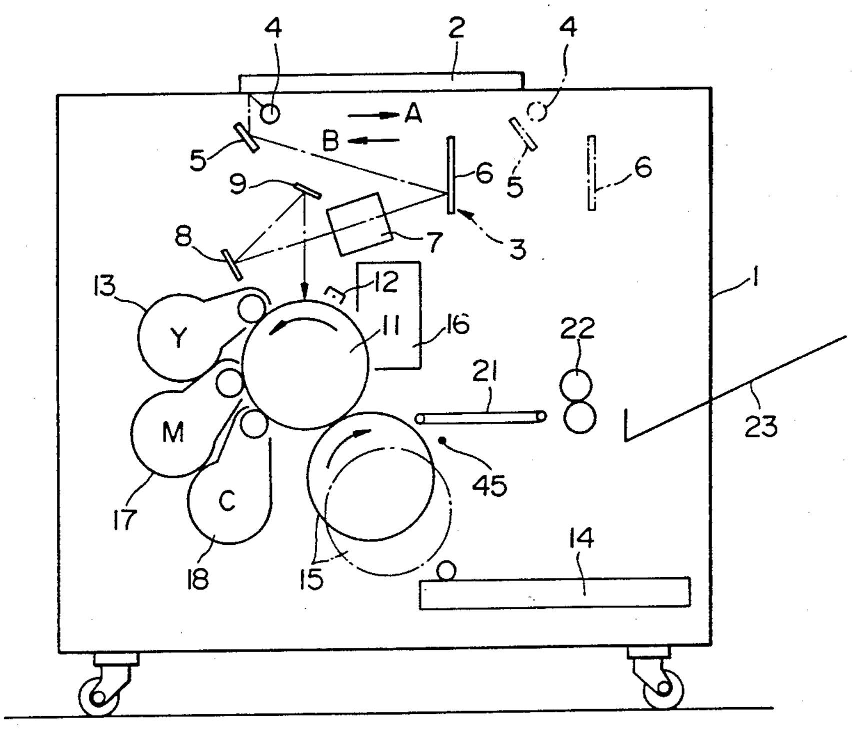
FIG.1 (Prior Art)
FIG. 1 is a schematic view of a conventional color copying machine.
Figure 2:
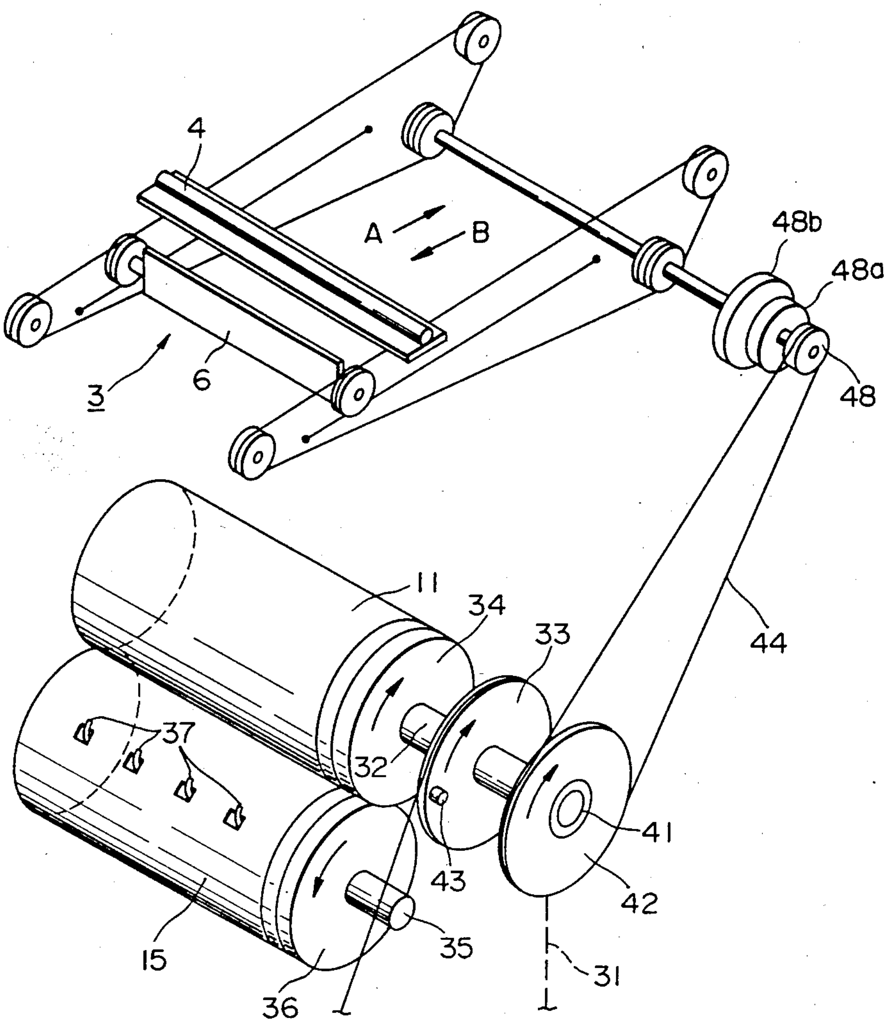
FIG.2 (Prior Art)
FIG. 2 is a perspective view of a main portion of the conventional color copying machine of FIG. 1.
Figure 3:
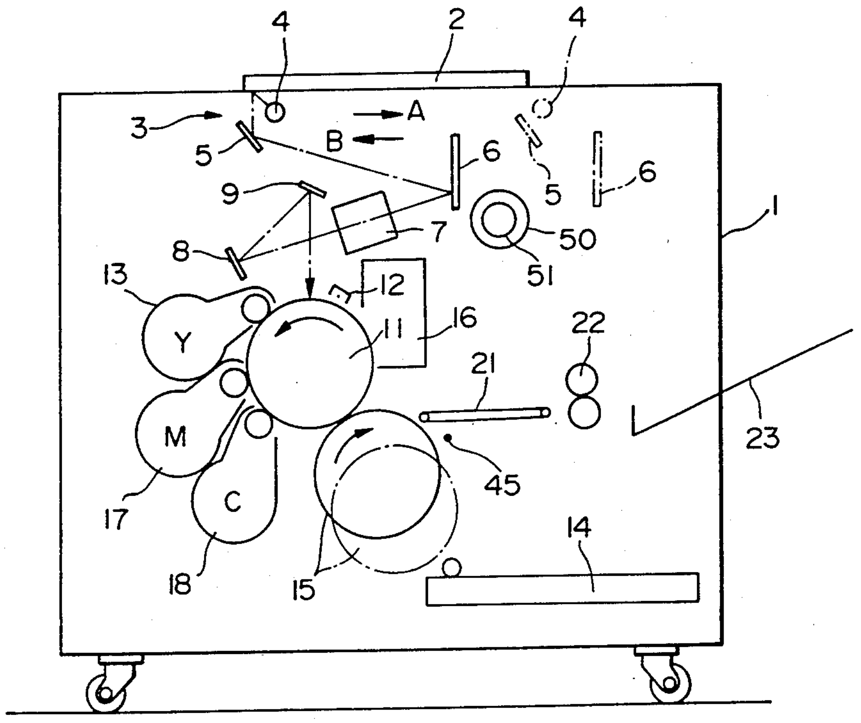
FIG. 3 is a schematic view of a copying machine provided in accordance with a first embodiment of the present invention.
Figure 4:
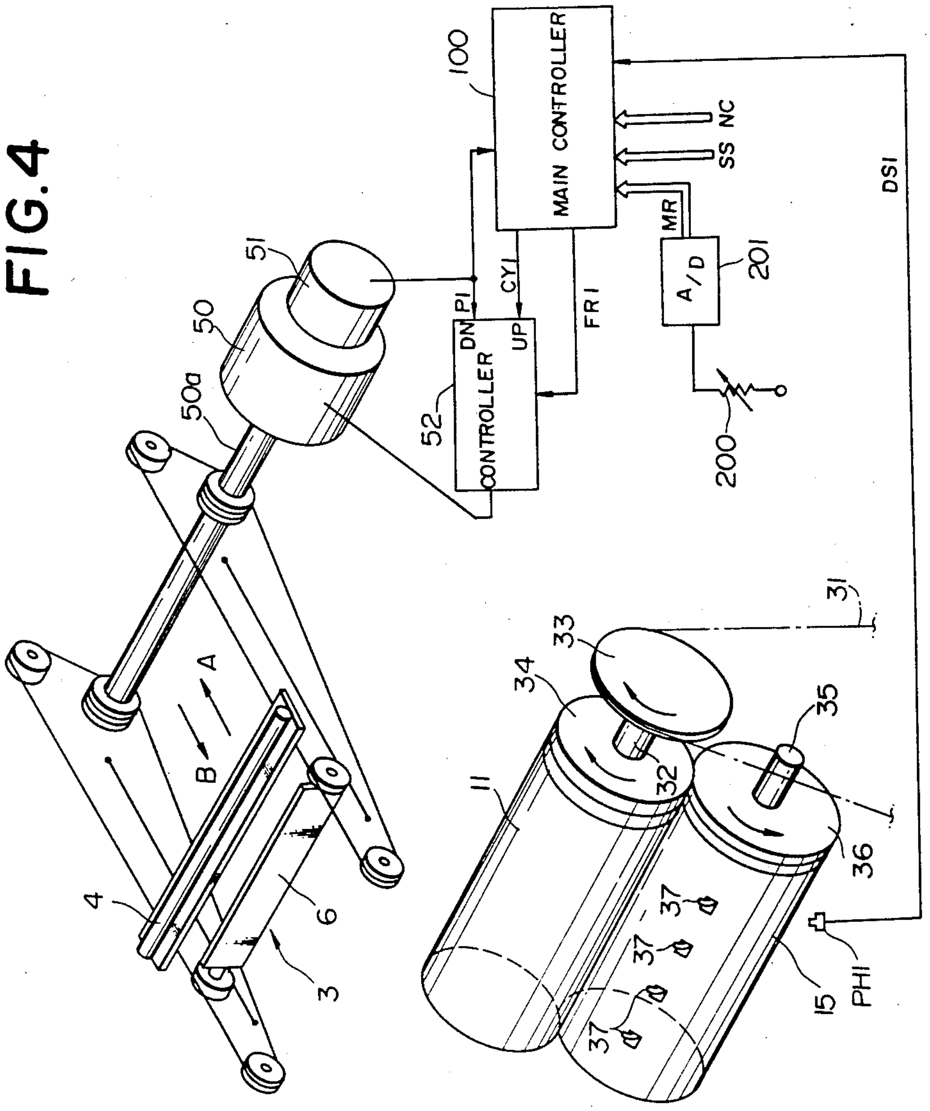
FIG. 4 is a perspective view of a main portion of the color copying machine of FIG. 3, wherein a control circuit for the scanning unit 3 is shown.

FIG. 3 is a schematic view of a color copying machine provided in accordance with a first embodiment of the invention, and FIG. 4 is a perspective view of the main portion of the copying machine of FIG. 3. This color copying machine is generally similar in construction to the color copying machine shown in FIGS. 1 and 2, and therefore, corresponding parts are designated by like reference characters, and detailed description thereof is omitted. In FIGS. 3 and 4, shown at 50 is an electric motor for driving the scanning unit 3 of this color copying machine. This motor 50 is provided with a rotary encoder 51 which outputs a pulse train $P_1$ whose pulse rate is proportional to the rotation speed of an output shaft 50*a* of the motor 50, the output shaft 50*a* being operatively connected to the scanning unit 3. The pulse train $P_1$ outputted from the rotary encoder 51 is supplied to a down-count input terminal DN of a controller 52. An up-count input terminal UP of this controller 52 is supplied with another pulse train $CY_1$ outputted from a main controller 100. The controller 52 includes counter means for up-counting the pulse signal $P_1$ and down-counting the pulse signal $CY_1$, and drives the motor 50 so that the contents of the counter means become always equal to "0". When a direction signal FR1 fed from the main controller 100 is in the "0" state, the controller counts down the pulse signal $CY_1$ and counts up the pulse signal $P_1$ so that the contents of its counter means becomes equal to "0". Thus, the rotation speed of the motor 50 is controlled in accordance with the pulse rate of the pulse signal $CY_1$, and the direction of rotation of the motor 50 is determined by the direction signal FR1.

Shown at 200 is a potentiometer which is manipulated by the operator to adjust a magnification rate at which the original manuscript is copied. A voltage appearing at one terminal of the potentiometer 200 is converted by an A/D converter 201 into digital data MR representative of the selected magnification rate and supplied to the main controller 100. The magnification rate is represented in terms of percentage, so that when the magnification rate is "1" the data MR is "100". The main controller 100 is also supplied with data SS representative of the size of the record sheet selected and data NC representative of the number of copies to be taken. These data are supplied from a control panel circuit (not shown). The color copying machine further comprises a photosensor PH1 located at the vicinity of the peripheral surface of the transfer drum 15. The photosensor PH1 detects the leading edge of a record sheet held by the drum 15 and supplies a detection signal DS1 to the main controller 100.

Figure 5:
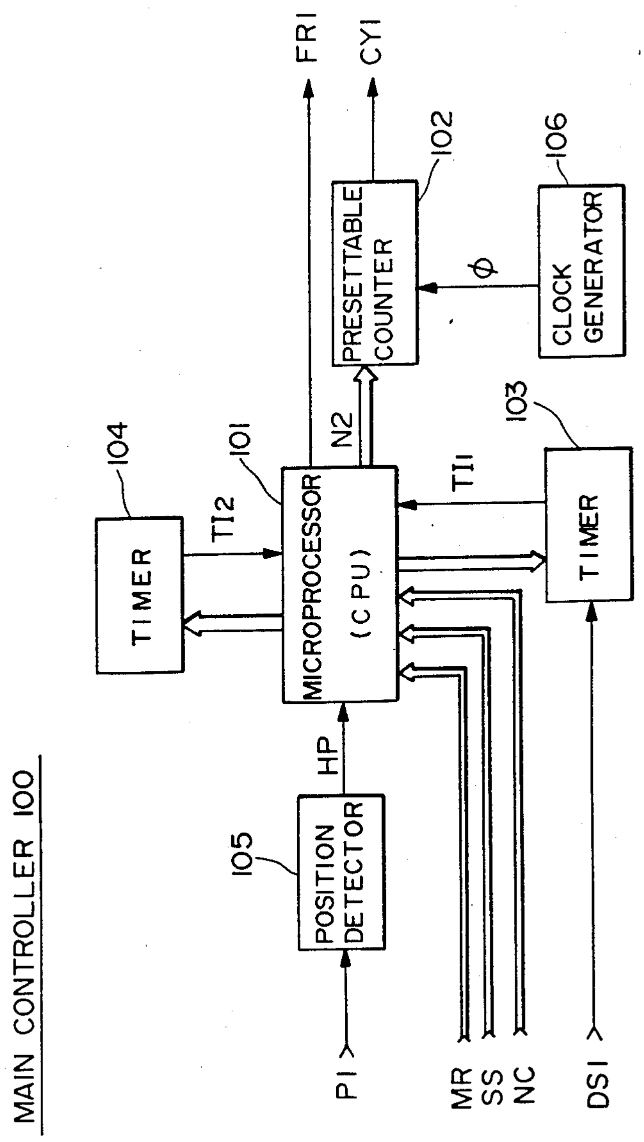
FIG. 5 is a circuit diagram of the main controller 100 of the color copying machine of FIG. 4.

As shown in FIG. 5, the main controller 100 comprises a microprocessor (CPU) 101, a presettable counter 102, two timers 103 and 104 and a position detector 105. The CPU 101 is of the conventional type and is programmed to be operated as later described. The presettable counter 102 is so constructed that it begins to count clock pulse $\phi$ fed from a clock generator 106 when data (data equal to "$N_2$" in this case) is supplied from the CPU 101 and that it outputs the pulse signal $CY_1$ each time its count value reaches $N_2$. Thus, the data $N_2$ determines the rotation speed of the motor 50.

Each of the timers 103 and 104 is so constructed that when timer data is supplied from the CPU 101 it stores the timer data thereinto and measures the time period represented by the stored timer data. The timer 103 outputs a timer interrupt signal $TI_1$ when the time period represented by the supplied timer data has lapsed, and the timer 104 outputs a timer interrupt signal $TI_2$ when the time period represented by the supplied timer data has lapsed. The position detector 105 counts the pulse signal $P_1$ from the rotary encoder 51 to output a detection signal HP to the CPU 101 when the scanning unit 3 is at its home position.

The operation of this color copying machine will now be described with reference to a time chart shown in FIG. 6.

When a copy-start button (not shown) is depressed by the operator, the electric motor operatively connected to the chain 31 begins to rotate, so that the photoconductive drum 11 and the transfer drum 15 begin to rotate. The CPU 101 first outputs timer data representative of a time period $t_1$ (see FIG. 6) to the timer 103. The $t_1$ is the timer period to be lapsed from the time when the photosensor PH1 detects the leading edge of a record sheet on the drum 15 to the time when scanning unit 3 is started to operate. In other words, when the scanning operation is started time period equal to $t_1$ after the generation of the signal DS1, the leading edge of a latent image formed on the drum 11 and the leading edge of the record sheet on the drum 15 reach the transfer position simultaneously.

When the photosensor PH1 detects the leading edge of the record sheet, the detection signal DS1 is outputted, so that the timer 103 begins to operate. As a result, the timer interrupt signal $TI_1$ is outputted time period equal to $t_1$ later. In response to the timer interrupt signal $TI_1$, the CPU 101 reads the data MR representative of the magnification rate, and the sheet-size data SS, and calculates the data N2, which determines the speed of the scanning unit 3, in accordance with the formula given below.

$$N2 = N1 \times \frac{MR}{100}$$

where N1 corresponds to the magnification rate of "1". The CPU 101 then outputs the data N2 to the presettable counter 102 and also outputs the direction signal FR1 of "1" to the controller 52. As a result, the presettable counter 102 outputs to the controller 52 the pulse signal $CY_1$ each time the count value of the clock pulse $\phi$ reaches "$N_2$". When the pulse signal $CY_1$ is supplied, the data contained in the counter means of the controller 52 is incremented and thus becomes not equal to "0", so that the controller 52 drives the motor 50, whereupon the rotary encoder 51 outputs the pulse signal $P_1$. This pulse signal $P_1$ is fed back to the controller 52 to decrement the data contained in the counter means thereof. In this case, the controller 52 drives the motor 50 in such a manner that the data contained in its counter means becomes equal to "0", so that the motor 50 rotates in accordance with the output of the pulse signal $CY_1$. Since the pulse signal $CY_1$ is outputted at a constant time interval determined by the data $N_2$, the rotation speed of the motor 50 is also determined by the data $N_2$. As a result, the motor 50 begins to rotate at a speed determined by the data N2 to initiate the scanning operation.

Figure 6:
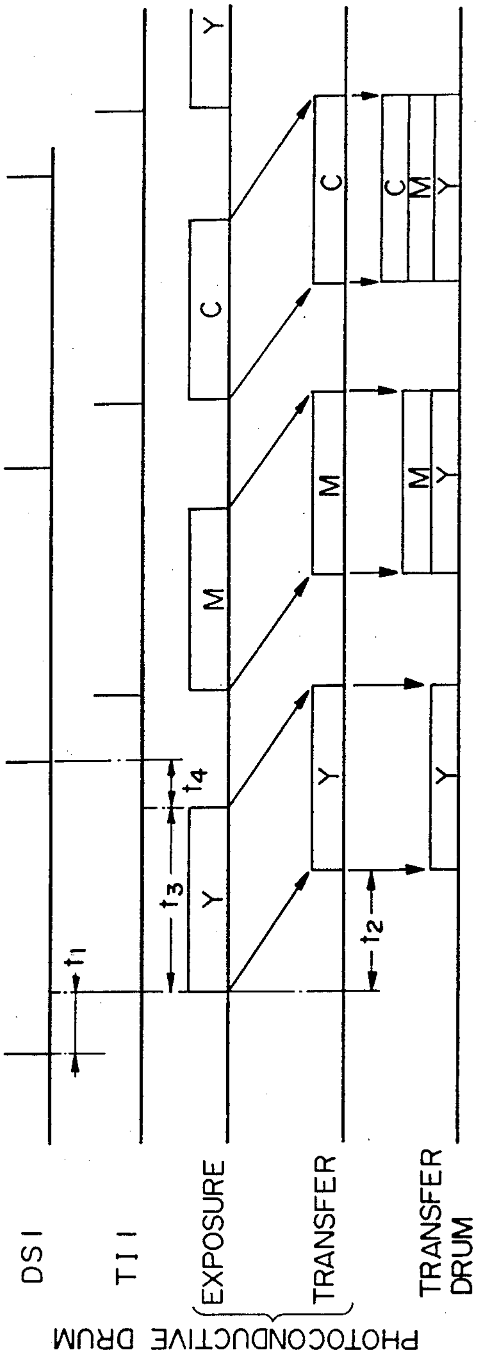
FIG. 6 is a time chart showing the operation of the color copying machine of FIG. 4.

Simultaneously with the output of the data $N_2$ to the presettable counter 102, the CPU 101 outputs timer data representative of a time period $t_3$ of FIG. 6 to the timer 104, whereupon the timer 104 begins to operate. The $t_3$ is the time period required to move the scanning unit 3 by a distance equal to the length of the selected sheet, which is determined by the sheet-size data SS, at the speed determined by the data $N_2$.

When the time period $t_3$ has lapsed, the timer 104 outputs the timer interrupt signal $TI_2$. In response to the signal $TI_2$, the CPU 101 outputs a predetermined value to the presettable counter 102 and at the same time changes the state of the signal FR1 from "1" to "0". As a result, the motor 50 begins to rotate in the reverse direction at a predetermined speed, so that the scanning unit 3 is returned to its home position. The latent image, thus formed on the drum 11 as the result of the scanning operation, begins to be transferred to the record sheet when the leading edge of the latent image and that of the record sheet reach the transfer position.

The above transferring operation is repeated three times to form a color copy image on the record sheet. When the data NC is greater than one, the above-described set of transferring operation is repeatedly carried out in accordance with the data NC.

The data $N_2$ outputted from the CPU 101 is so determined that when the data MR represents "100" the lamp 4 and the first mirror 6 move at a speed equal to the peripheral speeds of the photoconductive and transfer drum 11 and 15. And therefore, when the data MR is "100", the electrostatic latent image formed on the peripheral surface of the photoconductive drum 11 is equal in size to the image of the manuscript placed on the platen 2. On the other hand, when the data MR is greater than "100", the output time interval of the pulse signal $CY_1$ becomes longer, so that the lamp 4 and the first mirror 6 move at a speed lower than the peripheral speed of the photoconductive drum 11. As a result, the electrostatic latent image formed on the peripheral surface of the photoconductive drum 11 becomes greater in size than the image of the manuscript placed on the platen 2. Thus, an enlarged-scale copy can be obtained. When the data MR is less than "100", the output time interval of the carry signal $CY_1$ becomes shorter, so that the lamp 4 and the first mirror 6 move at a speed higher than the peripheral speed of the photoconductive drum 11. As a result, the electrostatic latent image formed on the peripheral surface of the photoconductive drum 11 is smaller in size than the image of the manuscript placed on the platen 2. Thus, a reduced-scale copy can be produced.

With this embodiment, the photoconductive drum 11 and the scanning unit 3 are connected to each other not mechanically but electrically, and are therefore free from any positional errors due to the aged-deterioration. It should also be noted that the data MR can be varied to produce an enlarged-scale and a reduced-scale copy of any desired size. For example, by using a suitable A/D converter as the source of the data MR, the magnification rate can be varied from 70% to 141% in unit of 1% or 0.1%.

A second embodiment of the invention will now be described.

Figure 7:
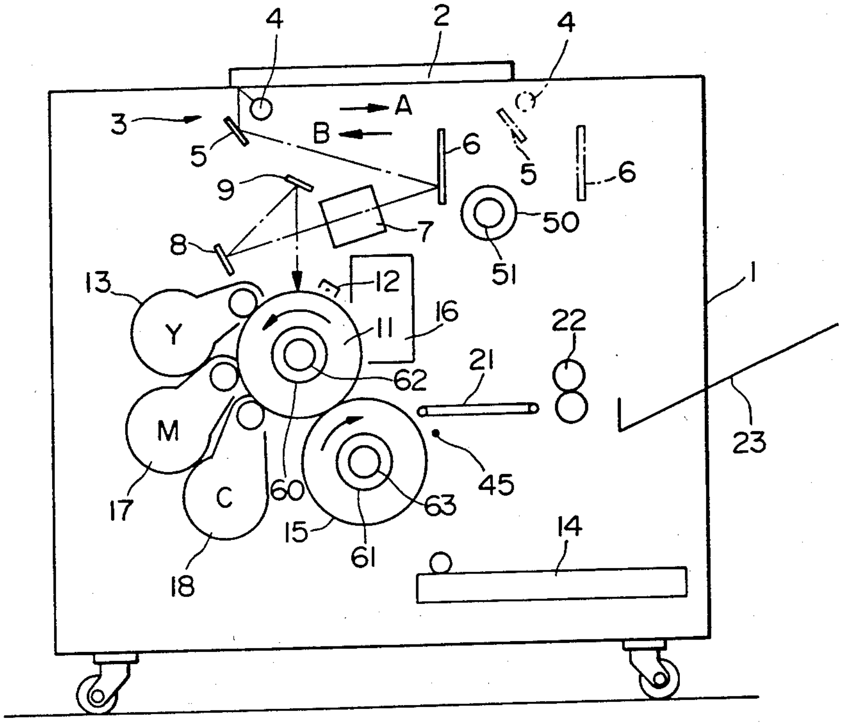
FIG. 7 is a schematic view of a copying machine provided in accordance with a second embodiment of the invention.
Figure 8:
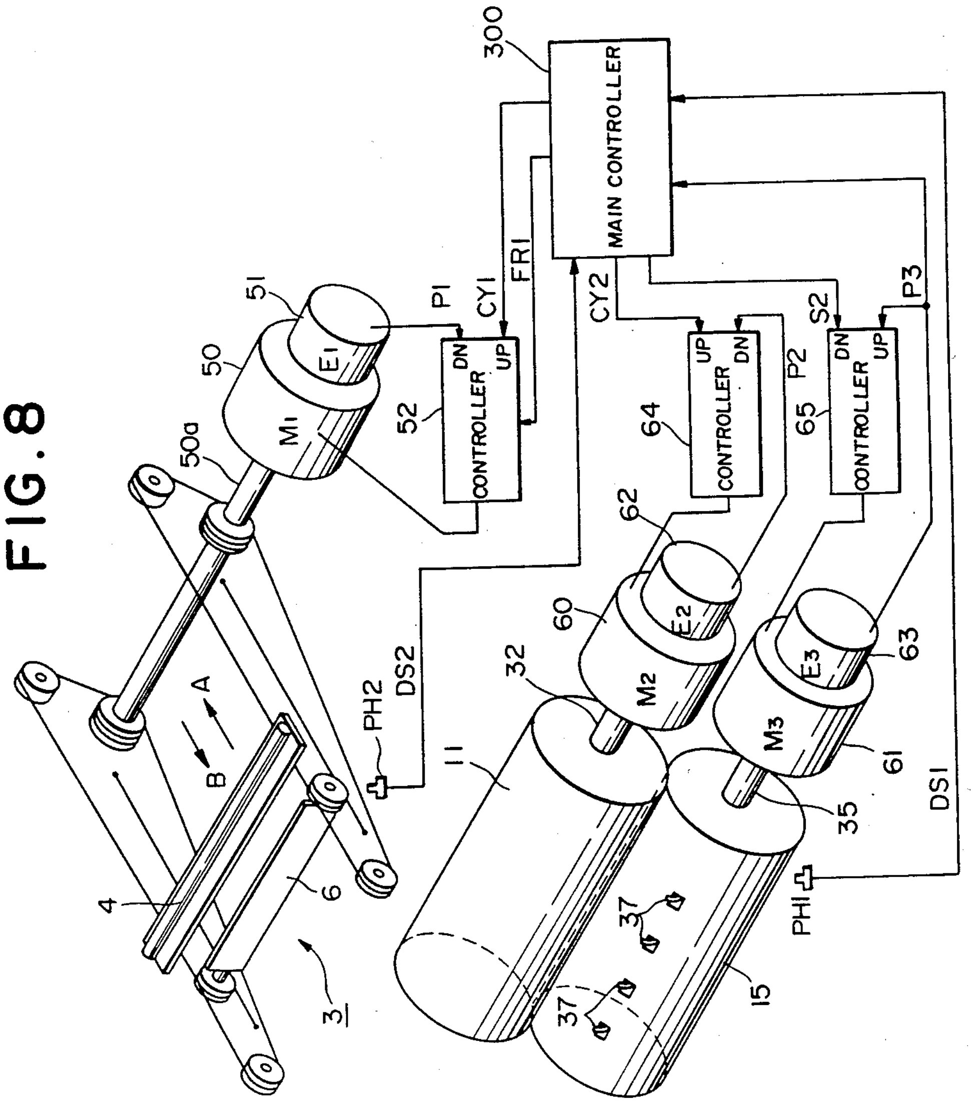
FIG. 8 is a perspective view of a main portion of the color copying machine of FIG. 7, wherein a control circuit for the scanning unit 3, photoconductive drum 11 and transfer drum 15 is shown.

The second embodiment shown in FIGS. 7 and 8 differs from the copying machine of FIGS. 3 and 4 in the following respects:

The shaft 32 of the photoconductive drum 11 is connected to an output shaft of an electric motor 60 which is provided with a rotary encoder 62 for detecting the amount of rotation of the output shaft. Similarly, the shaft 35 of the transfer drum 15 is connected to an output shaft of an electric motor 61 which is provided with a rotary encoder 63 for detecting the amount of rotation of the output shaft. The motor 60 and the rotary encoder 62 are connected to a controller 64 which is substantially identical in construction to the controller 52 of FIG. 4. Similarly, the motor 61 and the rotary encoder 63 are connected to a controller 65 which is identical in construction to the controller 64. An up-count terminal UP of the controller 64 is supplied with a pulse signal $CY_2$ outputted from a main controller 300, and a down-count terminal DN thereof is supplied with a pulse signal $P_2$ outputted from the rotary encoder 62. Similarly, an up-count terminal UP of the controller 65 is supplied with a pulse signal $S_2$ outputted from the main controller 300, and a down-count terminal DN thereof is supplied with a pulse signal $P_3$ outputted from the rotary encoder 63. The pulse signal $P_3$ is also supplied to the main controller 300. This copying machine further comprises a photosensor PH2 for outputting a detection signal DS2 when the scanning unit 3 is at its home position.

Figure 9:
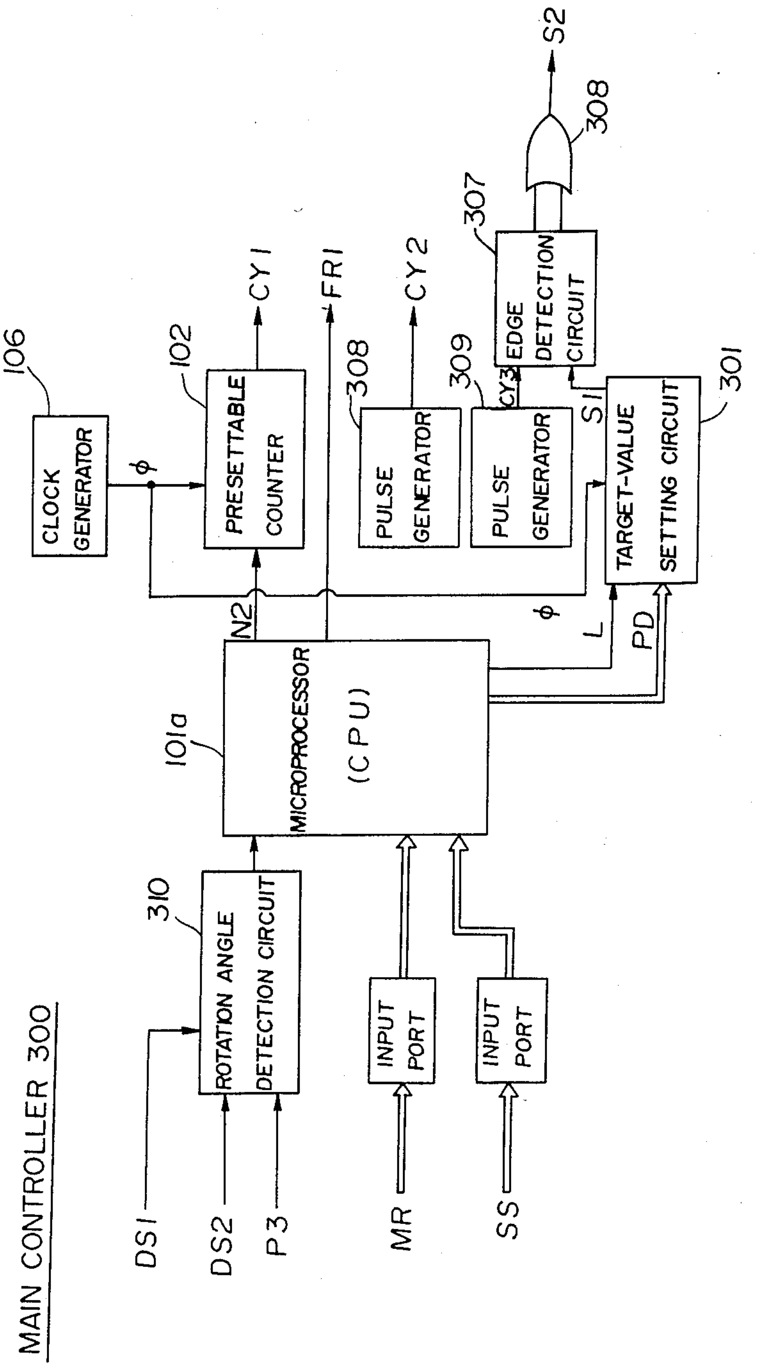
FIG. 9 is a circuit diagram of the main controller 300 of the color copying machine of FIG. 8.
Figure 10:
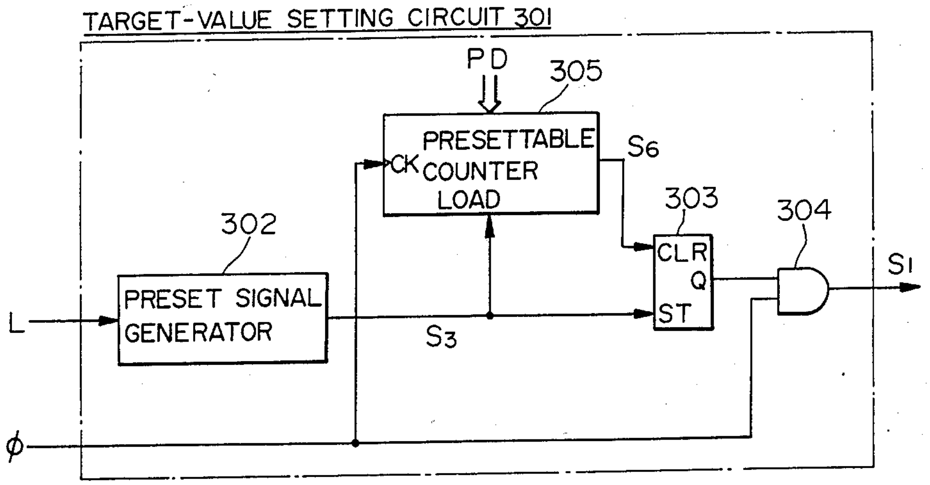
FIG. 10 is a circuit diagram of the target-value setting circuit 301 of the main controller 300 of FIG. 9.

As shown in FIG. 9, the main controller 300 comprises a microprocessor (CPU) 101*a* and a target-value setting circuit 301. As shown in FIG. 10, the target-value setting circuit 301 comprises a preset signal generator 302 which outputs a pulse signal $S_3$ of a predetermined pulse width in response to a signal L fed from the CPU 101*a*. The pulse signal $S_3$ is supplied to a set terminal ST of a flip-flop 303, whereupon the flip-flop 303 outputs a "1" signal from an output terminal Q thereof. This "1" signal is supplied to one input terminal of an AND gate 304 to enable it to open. The other input terminal of the AND gate 304 is supplied with the clock pulse $\phi$ fed from the clock generator 106. Thus, the clock pulse $\phi$ passes through the AND gate 304 and are outputted therefrom as a signal $S_1$. The signal $S_3$ outputted from the preset signal generator 302 is also supplied to a load terminal LOAD of a presettable counter 305, whereupon the presettable counter 305 stores thereinto preset data PD fed from the CPU 101*a* and at the same time begins to count the clock pulse $\phi$. When the count value of the clock pulses $\phi$ becomes equal to the preset data PD, the presettable counter 305 outputs a carry signal $S_6$ which is supplied to a clear terminal CLR of the flip-flop 303 to reset the output thereof to "0". When the output of the flip-flop 303 is reset to "0", the AND gate 304 closes to prevent the signal $S_1$ from being outputted therefrom.

As will be appreciated from the foregoing, the number of pulses of the clock pulse $\phi$ outputted as the signal $S_1$ coincides with the value represented by the preset data PD.

Referring again to FIG. 9, the signal $S_1$ from the target-value setting circuit 301 is supplied to one input terminal of an edge detection circuit 307. The main controller 300 also includes two pulse generators 308 and 309. The pulse generator 308 outputs the pulse signal $CY_2$, while the pulse generator 309 outputs a pulse signal $CY_3$ to the other input terminal of the edge detection circuit 307. The pulse rates of the clock pulses $CY_2$ and $CY_3$ determine the rotation speeds of the motors 60 and 61, respectively. In the case where the diameters of the drms 11 and 15 are equal to each other (as is the case with this embodiment), the pulse rates of the pulse signals $CY_2$ and $CY_3$ are set to be equal to each other. The edge detection circuit 307 has output terminals corresponding respectively to the input terminals, and detects a leading edge of each of the signals $CY_3$ and $S_1$ supplied to the input terminals to output a pulse signal of a short pulse width from a respective one of the output terminals. This edge detection circuit 307 is so constructed as to detect leading edges of the signals $CY_3$ and $S_1$ at timings shifted from each other, so that the leading edges of the signals $CY_3$ and $S_1$ can be detected individually even when both signals rise simultaneously. The output signals of the edge detection circuit 307 are added together by an OR gate 308 and outputted therefrom as the signal $S_2$. Thus, the signal $S_2$ outputted from the OR gate 308 is a pulse tran, and the number of pulses of the signal $S_2$ is equal to the sum of the number of leading edges of the signal $S_1$ and the number of leading edges of the signal $CY_3$.

Figure 11:
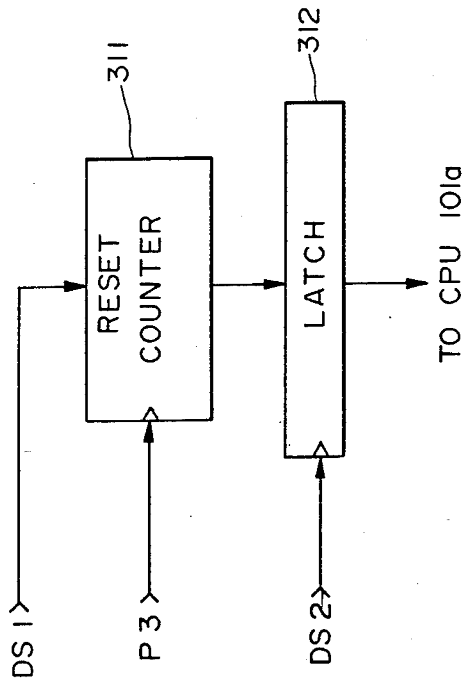
FIG. 11 is a circuit diagram of the rotation angle detection circuit 310 of the main controller 300 of FIG. 9.

The main controller 300 further comprises a rotation angle detection circuit 310 for detecting the rotation angle of the transfer drum 15. As shown in FIG. 11, the rotation detection circuit 310 comprises a counter 311 for counting the pulse signal $P_3$ from the rotary encoder 63. The count output of this counter 311 is reset to "0" each time the photosensor PH1 detects the leading edge of a record sheet on the drum 15 and outputs the signal DS1. Thus, the count output of the counter 311 represents the current rotation angle of the transfer drum 15. The rotation angle detection circuit 310 also comprises a latch 312 which latches the count output of the counter 311 when the photosensor PH2 outputs the detection signal DS2. Thus, the output of this latch 312 represents the rotation angle of the transfer drum 15 at the instant when the scanning unit 3 returns to its home position.

The operation of this copying machine will now be described.

Figure 12:
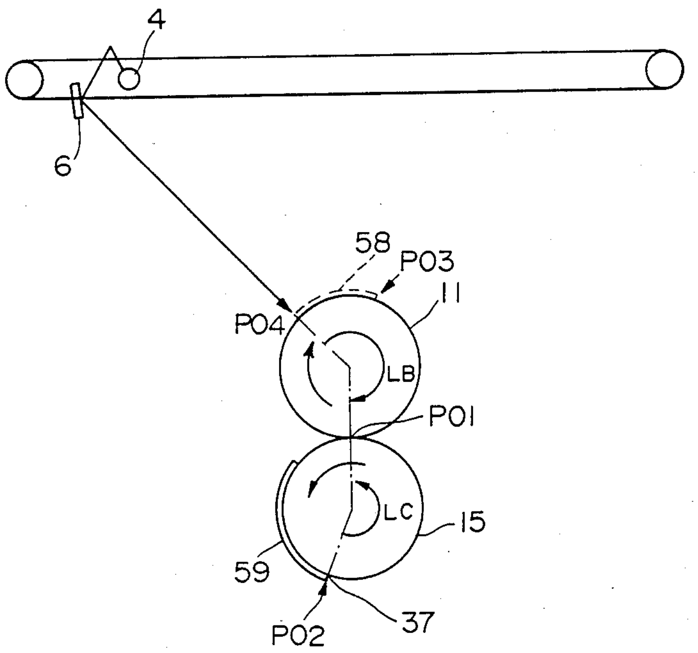
FIG. 12 is an illustration showing the relationship between the rotation angle of the photoconductive drum 11 and that of the transfer drum 15 of the color copying machine of FIG. 8.

FIG. 12 shows the relationship between the rotations of the photoconductive and transfer drums 11 and 15. In FIG. 12, shown at $P_{01}$ is the transfer position where a toner image formed on the photoconductive drum 11 is transferred to a record sheet wrapped around the transfer drum 15. Shown at 58 is an electrostatic image (or a toner image) formed on the photoconductive drum 11, wherein the leading edge of the toner image 58 is shown at a position $P_{03}$ of the drum 11. Shown at 59 is a record sheet wrapped around the transfer drum 15, wherein the leading edge of the record sheet 59 engages with the retractable projections 37 at a position $P_{02}$ of the drum 15. Shown at $P_{04}$ is an exposure position where the surface of the photoconductive drum 11 is exposed to the scanning beam. The rotation angle of the drum 15 from the position $P_{02}$ to the transfer position $P_{01}$ is represented by LC, and the rotation angle of the photoconductive drum 11 from the exposure position $P_{04}$ to the transfer position $P_{01}$ is represented by LB. In this case, if the positions $P_{02}$ and $P_{03}$ always reach the transfer position $P_{01}$ simultaneously, no shift of the toner images 58 on the record sheet 59 occurs.

If it is detected at the beginning of the exposure of the drum 11 to the scanning beam, that the rotation angles LB and LC are equal to each other, then the photoconductive and transfer drums 11 and 15 may be rotated at the same peripheral speed to cause the leading edge position $P_{03}$ of the toner image 58 and the leading edge position $P_{02}$ of the record sheet 59 to reach the transfer position $P_{01}$ simultaneously, whereby a copy can be obtained without any shift of toner images. On the other hand, when it is detected that the rotation angles LB and LC differ from each other, shifts of toner images may occur if the drums 11 and 15 are rotated at the same peripheral speed.

In this embodiment, therefore, if it is detected that the angle LB is smaller than the angle LC, the transfer drum 15 is rotated faster than the photoconductive drum 11, as later described, to compensate for the difference between the two angles LB and LC to thereby bring the leading edge of the toner image 58 into agreement with that of the record sheet 59.

The control of rotation of the photoconductive and transfer drums 11 and 15 effected in this copying machine will now be described.

Figure 13:
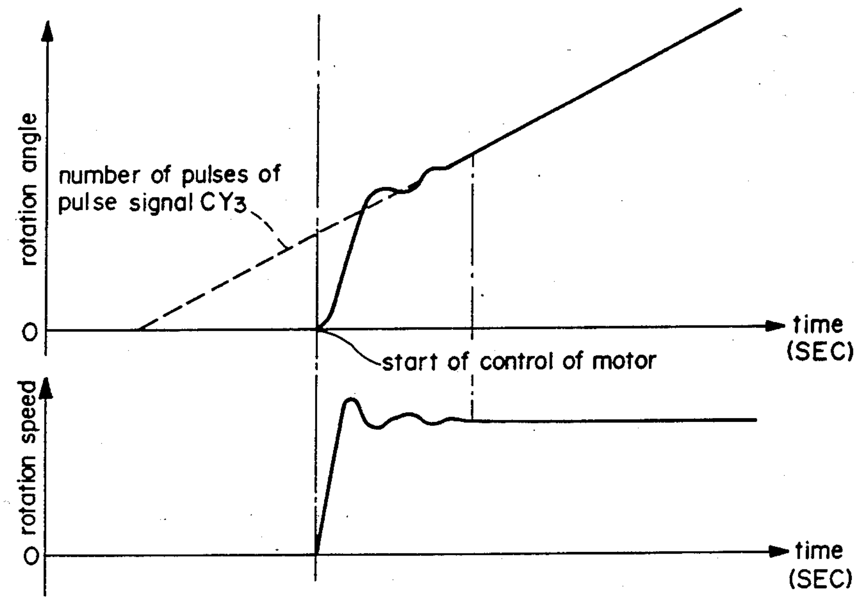
FIG. 13 is an illustration showing the variations of speed and rotation angle of the motor 61 of FIG. 8 during the time when the target-value setting circuit 301 of FIG. 9 is not in operation.

When the target-value setting circuit 301 is not in operation, the signal $S_2$ supplied to the controller 65 is the same as the pulse signal $CY_2$ supplied to the controller 64 since the target-value setting circuit 301 does not output the signal $S_1$ and the pulse rates of the signals $CY_2$ and $CY_3$ are the same. And therefore, the motors 60 and 61 rotate at the same speed, so that the photoconductive and transfer drums 11 and 15 also rotate at the same speed. In this case, as the signal $CY_3$ acts as a speed command signal, the rotation angle and the rotation speed of the motor 61 vary as shown in FIG. 13.

Figure 14:
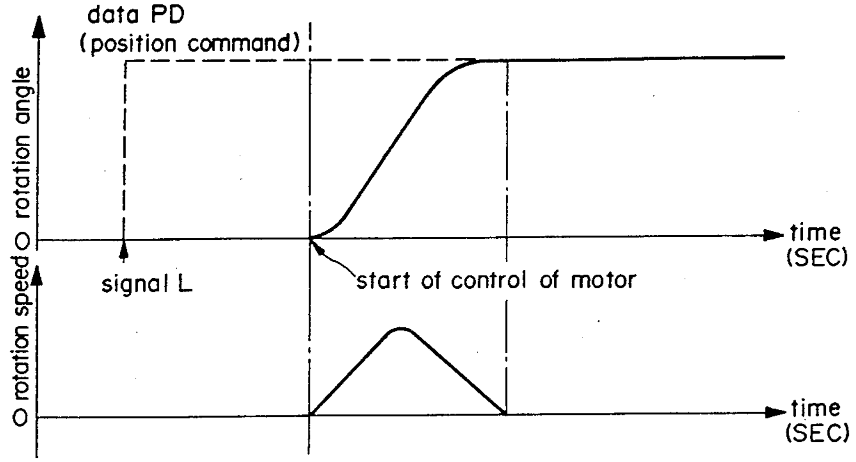
FIG. 14 is an illustration showing the variations of speed and rotation angle of the motor 61 of FIG. 8 during the time when the signal L is outputted and when the pulse signal $CY_3$ is not outputted.

If the signal L is supplied from the CPU 101*a* when the pulse signal $CY_3$ is not outputted, only the signal $S_1$ is outputted, so that the signal $S_2$ becomes equal to the signal $S_1$. In this case, the number of pulses of the signal $S_1$ is equal to the data PD supplied from the CPU 101*a*, and therefore, the number of pulses of the signal $S_2$ supplied to the controller 65 is also equal to the data PD. As a result, the motor 61 rotates by an amount determined by the preset data PD and then stops. Thus, the preset data PD acts as a position control data for the motor 61, and the rotation angle and the rotation speed of the motor 61 vary as shown in FIG. 14.

If the target-value setting circuit 301 is started to operate during the time when the pulse signal $CY_3$ is being outputted, the signal $S_2$ is a composite signal of the pulse signal $CY_3$ and the signal $S_1$. As a result, the motor 61 is accelerated during the time when the signal $S_1$ is outputted. The variations of rotation angle and speed of the motor 61 in this case are shown in FIG. 15.

Figure 15:
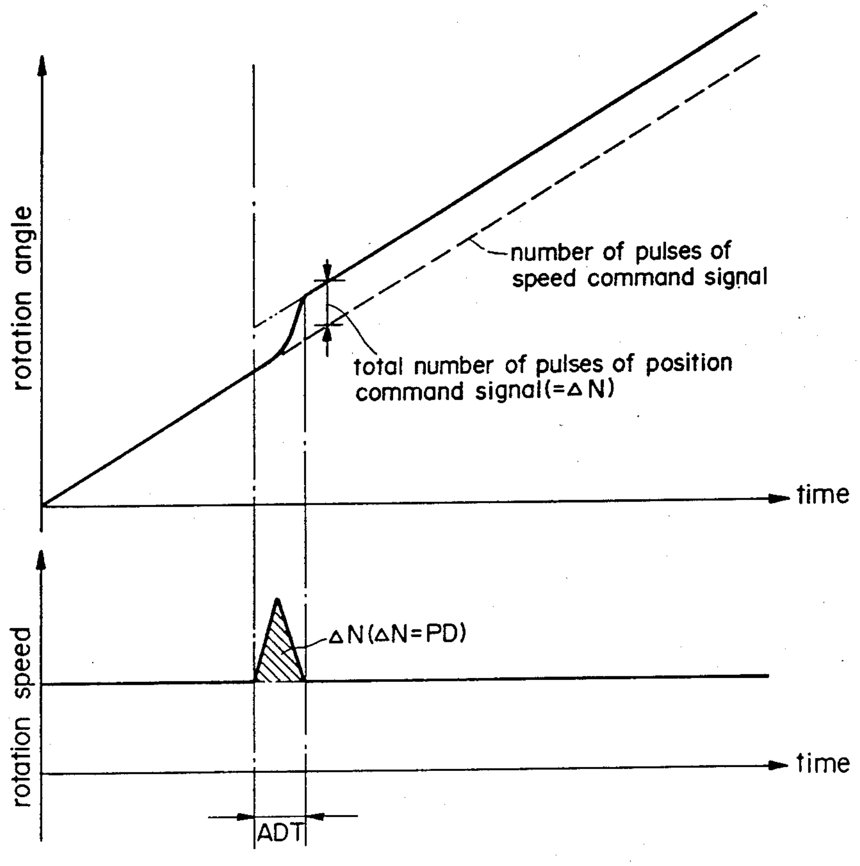
FIG. 15 is an illustration showing the variations of speed and rotation angle of the motor 61 of FIG. 8 during the time when the target-value setting circuit 301 operates while the pulse signal $CY_3$ being outputted.

When the rotation angles LBand LC of the photoconductive and transfer drums 11 and 15 differ from each other, a difference $\Delta$ N between the two angles LB and LC is compensated in a manner shown in FIG. 15 to cause the leading edges $P_{02}$ and $P_{03}$ to reach the transfer position $P_{01}$ simultaneously. More specifically, the preset data PD corresponding to the difference $\Delta$ N between the two angles LB and LC shown in FIG. 12 can be obtained from the equation given below.

$$PD = LC - LB$$

Thus, the amount of rotation of the motor 61 added during the acceleration-and-deceleration period ADT shown in FIG. 15 can be adjusted to correspond to the difference $\Delta$ N between the two angles LB and LC. After the temporary acceleration of the transfer drum 15 is completed, the photoconductive drum 11 and the transfer drum 15 are driven so as to rotate at the same speed, so that the leading edge position $P_{02}$ and the leading edge position $P_{03}$ reach the transfer position $P_{01}$ exactly simultaneously.

Figure 16:
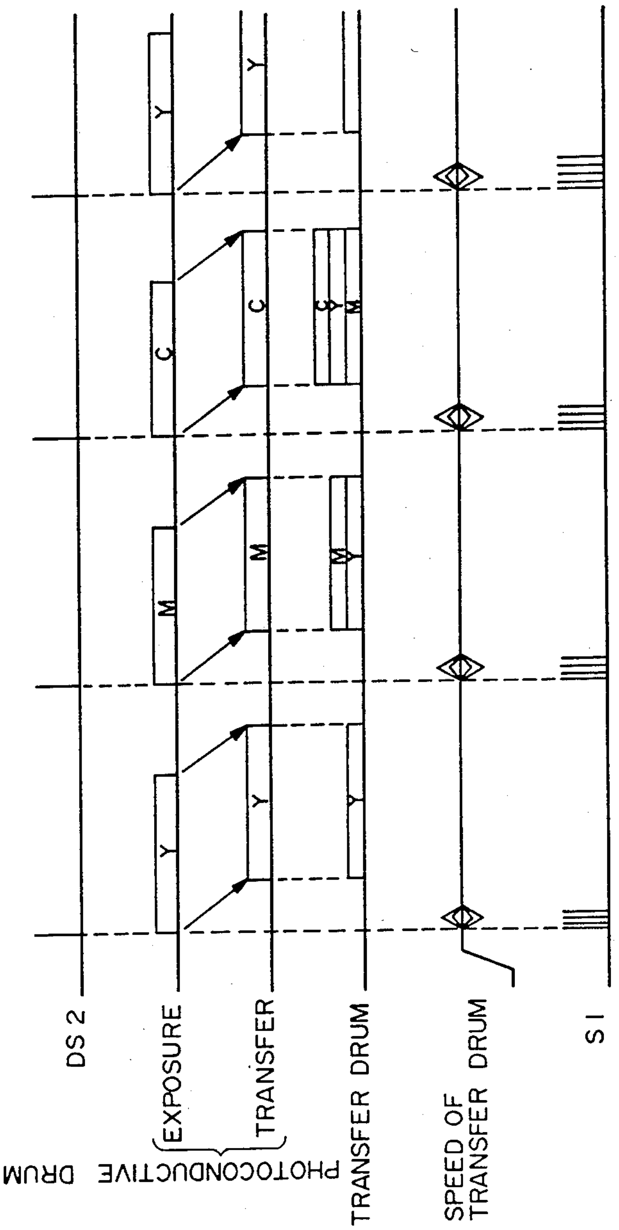
FIG. 16 is a time chart illustrating the sequential color copying operation of the color copying machine of FIG. 8.

When the photosensor PH2 outputs the detection signal DS2, the CPU 101*a* reads the output of the rotation angle detection circuit 310 and determines the difference between the two angles LB and LC. Then, the CPU 101*a* calculates the data PD and outputs it to the target value setting circuit 301 together with the signal L to thereby accelerate or decelerate the motor 61. FIG. 16 is a timing chart showing the compensation for the difference between the two angles LB and LC effected during the time when three consecutive scanning and transferring operations are carried out to produce a color copy.

As described above, with the color copying machine provided in accordance with the present invention, undesirable shifts of toner images on a record sheet due to aged deterioration of the mechanical parts can be prevented. With the color copying machine provided in accordance with the present invention, the speed of the scanning unit can be varied substantially analogously to select any desired magnification rate without any shift of toner images on a record sheet.

What is claimed is:

1. A control apparatus for a color copying machine, said color copying machine comprising:

scanning means driven by a motor for applying a scanning beam onto a manuscript to effect a scanning operation, said motor being driven by a drive means;

a photoconductive drum operable to rotate for being exposed to said scanning beam to form on a peripheral surface thereof a latent image of an image on a scanned manuscript;

means for applying a toner to said latent image to form a toner image on said peripheral surface of said photoconductive drum;

a transfer drum for holding a record sheet therearound on a peripheral surface thereof and operable to rotate to thereby transfer said toner image on said photoconductive drum ot a held record sheet to form a copy image of said manuscript on said held record sheet; and said control apparatus comprising:

means for providing data representative of a magnification rate of said copy image to be formed on said record sheet to said image on said manuscipt;

calculation means for calculating data representative of a speed of said motor in accordance with said magnification-rate data; and control means responsive to said speed data for driving said motor at a speed represented by said speed data, said control means including pulse generating means for generating, in accordance with said speed data, a first pulse train whose pulse rate is determined by said speed data;

rotary encoder means operatively connected to said motor for outputting a second pulse train, the number of pulses of said second pulse train representing the amount of rotation by which said motor has been rotated; and said drive means having counter means for up-counting the pulses of one of said first and second pulse trains and for down-counting the pulses of the other of said first and second pulse trains, said drive means driving said motor so that a count output of said counter means always represents a predetermined value, whereby said scanning means effects said scanning operation at a speed determined by said magnification rate.

2. A control apparatus for a color copying machine according to claim 1, wherein said calculation means calculates said speed data further in accordance with a size of said manuscript.

3. A control apparatus for a color copying machine according to claim 2 further comprising timer means, and wherein said calculation means further calculates data representative of a time interval which said scanning means requires to scan the entire surface of said manuscript at said speed determined in accordance with said magnification rate and said size of said manuscript, said calculation means outputting said time-interval data to said timer means when said control means begins to drive said motor at said speed determined by said speed data, said timer means being responsive to said time-interval data for outputting a timing signal when said timer interval has lapsed, said control means being further responsive to said timing signal for driving said motor at a predetermined speed in the reverse direction, whereby said scanning means is returned to its home position at a predetermined speed.

4. A control apparatus for a color copying machine according to claim 1 further comprising detector means disposed at a predetermined position adjacent said transfer drum for detecting a leading edge of said record sheet to output a detection signal, said pulse generating means beginning said generation of said first pulse train a predetermined time period after the output of said detection signal.

5. A control apparatus for a color copying machine, said color copying machine comprising:

scanning means driven by a first motor for applying a scanning beam onto a manuscript to effect a scanning operation;

a photoconductive drum operable to rotate at a predetermined speed for being exposed to said scanning bema to form on a peripheral surface thereof a latent image of an image on a scanned manuscript;

means for applying a toner to said latent image to form a toner image on said peripheral surface of said photoconductive drum;

a transfer drum for holding a record sheet therearound on a peripheral surface thereof and driven by a second motor for rotating to thereby transfer said toner image on said photoconductive drum to a held record sheet at a transfer position where said transfer drum is in contact with said photoconductive drum through said held record sheet, whereby a copy image of said manuscript is formed on said held record sheet; and said control apparatus comprising:

means for providing data representative of a magnification rate of said copy image to be formed on said held record sheet to said image on said manuscript;

calculation means for calculating data representative of a speed of said first motor in accordance with said magnification-rate data;

first control means responsive to said speed data for driving said first motor at a speed determined by said speed data;

second control means for driving said second motor;

first detector means for outputting a first detection signal when said scanning means is at its home position;

second detector means disposed at a predetermined position adjacent said transfer drum for detecting a leading edge of said held record sheet on said transfer drum to output a second detection signal;

position detector means operatively connected to said transfer drum and responsive to said second detection signal for outputting data representative of a position of the leading edge of said held record sheet on said transfer drum;

error detection means responsive to said first detection signal for detecting, in accordance with said position data, a difference between a peripheral length of said photoconductive drum from a position thereof where said scanning beam is applied to said transfer position and a peripheral length of said transfer drum from said leading edge of said record sheet to said transfer position, to output data representative of said difference; and error correction means responsive to said difference data for causing said second control means to change said speed of said second motor to compensate for said difference.

6. A control apparatus for a color copying machine according to claim 5, wherein said second control means comprises:

pulse generating means for generating a first pulse train of a predetermined pulse rate;

rotary encoder means operatively connected to said second motor for outputting a second pulse train, the number of pulses of said second pulse train representing the amount of rotation by which said second motor has been rotated; and drive means having counter means for up-counting the pulses of one of said first and second pulse trains and for down-counting the pulses of the other of said first and second pulse trains, said drive means driving said second motor so that a count output of said counter means always represents a predetermined value.

7. A control apparatus for a color copying machine according to claim 6, wherein said position detector means comprises a counter for counting the pulses of said second pulse train outputted from said rotary encoder means and for outputting a count data of said pulses as said position data, said count data being reset to zero when said second detection signal is supplied to said counter.

8. A control apparatus for a color copying machine according to claim 7, wherein said error correction means comprises a pulse generator for outputting a series of pulse signals whose pulse number is proportional to said difference data, said series of pulse signals being added to said first pulse train generated by said pulse generating means.

* * * * *

UNITED STATES PATENT AND TRADEMARK OFFICE
CERTIFICATE OF CORRECTION

PATENT NO. : 4,796,054
DATED : January 3, 1989
INVENTOR(S) : Maeno, et al.

It is certified that error appears in the above-identified patent and that said Letters Patent is hereby corrected as shown below:

In the Abstract, line 2, delete --color--.

Column 3, line 3, insert --color-- before "copying machine".

Column 5, line 1, insert --color-- before "copying machine".

Column 5, line 11, insert --color-- before "copying machine".

Column 5, line 54, "the copying" should be --the color copying--.

Column 8, line 39, "unit" should be --units--.

Column 8, line 43, insert --color-- before "copying machine".

Column 8, line 67, insert --color-- before "copying machine".

Column 9, line 44, "drms" should be --drums--.

Column 10, line 13, insert --color-- before "copying machine".

UNITED STATES PATENT AND TRADEMARK OFFICE

CERTIFICATE OF CORRECTION

PATENT NO. : 4,796,054

DATED : January 3, 1989

INVENTOR(S) : Maeno, et al.

It is certified that error appears in the above-identified patent and that said Letters Patent is hereby corrected as shown below:

Column 10, line 58, insert --color-- before "copying machine".

Column 11, line 22, "LBand" should be --LB and--.

Column 13, line 13, "bema" should be --beam--.

Signed and Sealed this

Fifth Day of September, 1989

Attest:

DONALD J. QUIGG

*Attesting Officer*

*Commissioner of Patents and Trademarks*